US012406502B2

(12) United States Patent
Wong et al.

(10) Patent No.: US 12,406,502 B2
(45) Date of Patent: Sep. 2, 2025

(54) ENRICHED AND DISCRIMINATIVE CONVOLUTIONAL NEURAL NETWORK FEATURES FOR PEDESTRIAN RE-IDENTIFICATION AND TRAJECTORY MODELING

(71) Applicant: The Hong Kong University of Science and Technoloy, Hong Kong (CN)

(72) Inventors: Kok Yiu Wong, Hong Kong (CN); Jack Chin Pang Cheng, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 436 days.

(21) Appl. No.: 17/873,462

(22) Filed: Jul. 26, 2022

(65) Prior Publication Data

US 2023/0095533 A1    Mar. 30, 2023

Related U.S. Application Data

(60) Provisional application No. 63/249,025, filed on Sep. 28, 2021.

(51) Int. Cl.
| | |
|---|---|
| *G06V 20/52* | (2022.01) |
| *G06T 7/292* | (2017.01) |
| *G06V 10/46* | (2022.01) |
| *G06V 10/74* | (2022.01) |
| *G06V 10/762* | (2022.01) |

(52) U.S. Cl.
CPC .............. *G06V 20/52* (2022.01); *G06T 7/292* (2017.01); *G06V 10/46* (2022.01); *G06V 10/761* (2022.01); *G06V 10/762* (2022.01)

(58) Field of Classification Search
CPC ...... G06V 20/52; G06V 40/103; G06V 40/10; G06V 10/7625; G06V 10/762; G06V 40/173; G06F 18/231; G06F 18/23
See application file for complete search history.

(56) References Cited

U.S. PATENT DOCUMENTS

2022/0415023 A1* 12/2022 Han .................... G06V 10/761

OTHER PUBLICATIONS

Li, Peng, et al. "State-aware re-identification feature for multi-target multi-camera tracking." Proceedings of the IEEE/CVF Conference on Computer Vision and Pattern Recognition Workshops. 2019. (Year: 2019).*

(Continued)

*Primary Examiner* — Raphael Schwartz
(74) *Attorney, Agent, or Firm* — Leydig, Voit & Mayer, Ltd.

(57) ABSTRACT

A system for pedestrian re-identification comprises multiple cameras and a computing system. The cameras are configured to obtain data. The data comprises multiple images associated with one or more objects. The computing system is configured to extract features for each of the multiple images, determine a descriptor for each of the multiple images, and identify one or more images among the multiple images associated with an object among the one or more objects based on the descriptors of the multiple images. A respective descriptor for a respective image comprises a first set of units representing all the extracted features in the respective image and a second set of units representing a subset of the extracted features in the respective image.

20 Claims, 6 Drawing Sheets

(56) References Cited

OTHER PUBLICATIONS

Wong, Peter Kok-Yiu, et al. "Enriched and discriminative human features for person re-identification based on explainable behaviors of convolutional neural networks." International Conference on Computing in Civil and Building Engineering. Cham: Springer International Publishing, Jul. 14, 2020. (Year: 2020).*
Alam, K, et al., "A dynamic ensemble learning algorithm for neural networks" *Neural Computing and Applications*, 32(12), pp. 8675-8690, (2020).
Cha, Y.J., et al., "Deep Learning-Based Crack Damage Detection Using Convolutional Neural Networks", *Computer-Aided Civil and Infrastructure Engineering*, 32(5), pp. 1-18, (2017).
Chi, S., et al., A Methodology for Object Identification and Tracking in Construction Based on Spatial Modeling and Image Matching Techniques, *Computer-Aided Civil and Infrastructure Engineering*, (24)3, pp. 199-211, (2009).
Chmielewska, A., et al., "New Approach to Traffic Density Estimation Based on Indoor and Outdoor Scenes from CCTV", *Foundations of Computing and Decision Sciences*, 40(2), pp. 119-132, (2015).
Chu, C.Y., "A Computer Model for Selecting Facility Evacuation Design Using Cellular Automata", *Computer-Aided Civil and Infrastructure Engineering*, 24(8), pp. 608-662, (2009).
Dai, Z., et al., "Batch DropBlock Network for Person Re-identification and Beyond", *Proceedings of the IEEE International Conference on Computer Vision*, pp. 3691-3701, (2019).
Ewing, R., "Eight Qualities of Pedestrian and Transit-Oriented Design", *In Pedestrian and Transit Oriented Design*, 11 pages total, (2013).
Gao, J., et al., "Revisiting Temporal Modeling for Video-based Person ReID", *ArXIv Preprint ArXIV*:1805.02104v2, pp. 1-11, (2018).
He, K., et al., "Deep Residual Learning for Image Recognition", *Proceedings of the IEEE Conference on Computer Vision and Pattern recognition*, pp. 770-778, (Dec. 2016).
Hermans, A., et al., "In Defense of the Triplet Loss for Person Re-Identification", *ArXiv Preprint ArXiv*:1703.07737v4, pp. 1-17, (2017).
Huang, J. et al., "Speed/accuracy trade-offs for modern convolutional objects detectors", *Proceedings—30th IEEE Conference on Computer Vision and Pattern Recognition*, CVPR 2017, pp. 7310-7319, (Jan. 2017).
Kelly, C.E., et al., "A comparison of three methods for assessing the walkability of the pedestrian environment", *Journal of Transport Geography*, 19(6), pp. 1500-1508, (2011).
Li, P., et al., "State-aware Re-identification Feature for Multi-target Multi-camera Tracking", *Proceedings of the IEEE Conference on Computer Vision and Pattern Recognition Workshops*, 11 pages total, (2019).
Li, Shengyuan, et al., "Automatic pixel-level multiple damage detection of concrete structure using fully convolutional network", *Computer-Aided Civil and Infrastructure Engineering*, 34(7), pp. 1-19, (2019).
Li, Shuang, et al., "Diversity Regularized Spatiotemporal Attention for Video-based Peron Re-identification", *Proceedings of the IEEE Conference on Computer Vision and Pattern Recognition*, pp. 369-378, (2018).
Li, W, et al., DeepReID: Deep Filter Pairing Neural Network for Person Re-Identification, *The IEEE Conference on Computer Vision and Pattern Recognition (CVPR)*, pp. 1-8, (2014).
Li, W., et al., "Harmonious Attention Network for Person Re-Identification", *Proceedings of the IEEE Conference on Computer Vision and Pattern Recognition, Ii*, pp. 2285-2294, (2018).
Liang, X., "Image-based post-disaster inspection of reinforced concrete bridge systems using deep learning with Bayesian optimization", *Computer-Aided Civil and Infrastructure Engineering*, pp. 415-430, (2018).

Luo, W., et al., "Multiple Object Tracking: A Literature Review", *ArXiv Preprint ArXiv*:1409.7618v5, pp. 1-49, (2014).
Mignon, A., et al., "PCCA: A new approach for distance learning from sparse pairwise constraints", *HAL open science*, 2012 IEEE Conference on Computer Vision and Pattern Recognition, pp. 2666-2672, (2012).
Minoli, D., et al. "IoT Considerations, Requirements, and Architectures for Smart Buildings—Energy Optimization and Next Generation Building Management Systems", *IEEE Internet of Things Journal*, 4(1), pp. 1-15, (2017).
Nambiar, A, et al., "A multi-camera video dataset for research on high-definition surveillance", *International Journal of Machine Intelligence and Sensory Signal Processing*, 1(3), pp. 267-286 (2014).
Pathak, A.R., et al., "Application of Deep Learning for Object Detection", *In Procedia Computer Science, International Conference on Computational Intelligence and Data Science*, (ICCIDS) vol. 132, pp. 1706-1717, (2018).
Pedagadi, S., et al., "Local Fisher Discriminant Analysis for Pedestrian Re-identification", *Proceedings of the IEEE Conference on Computer Vision and Pattern Recognition (CVPR)*, pp. 3318-3325, (Jun. 2013).
Qian, X., et al., "Multi-scale Deep Learning Architectures for Person Re-identification", *IEEE International Conference on Computer Vision (ICCV)*, pp. 5399-5408, (2017).
Quispe, R. et al., "Improved Person Re-Identification Based on Saliency and Semantic Parsing with Deep Neural Network Models", *Image and Vision Computing*, 92, 103809, arXiv:1807.05618v1, 10 pages, (2019).
Rabie, T., et al., "Mobile Active-Vision Traffic Surveillance System for Urban Networks", *Computer-Aided Civil and Infrastructure Engineering*, 20(4), pp. 231-241, (2005).
Ristani, E., et al., "Features for Multi-Target Multi-Camera Tracking and Re-Identification", *Proceedings of the IEEE Computer Society Conference on Computer Vision and Pattern Recognition*, pp. 6036-6046, (2018).
Samek, W., et al., "Explainable Artificial Intelligence: Understanding, Visualizing and Interpreting Deep Learning Models", *ArXiv Preprint ArXiv*:1708.08296v1, 8 pages total, (2017).
Wang, H., et al., "Parameter-Free Spatial Attention Network for Person Re-Identification", *ArXiv Preprint ArXiv*:1811.12150v1, 11 pages total, (2018).
Wojke, N., et al., "Deep Cosine Metric Learning for Person Re-Identification", *2018 IEEE Winter Conference on Application of Computer Vision (WACV)*, arXiv:1812.00442v1, 9 pages total, (2018).
Wu, R.T., "Pruning deep convolutional neural networks for efficient edge computing in condition assessment of infrastructures", *Computer-Aided and Infrastructure Engineering*, 34(9), pp. 1-16, (2019).
Xiao, T., et al., "Learning Deep Feature Representations with Domain Guided Dropout for Person Re-identification", *Proceedings of the IEEE Computer Society Conference on Computer Vision and Pattern Recognition*, 10 pages total, (2016).
Yang. W., et al., "Towards Rich Feature Discovery with Class Activation Maps Augmentation for Peron Re-Identification", *Proceedings of the IEEE Computer Society Conference on Computer Vision and Pattern Recognition*, pp. 1389-1398, (Jun. 2019).
Zagoruyko, S., et al., "Paying More Attention to Attention: Improving the Performance of Convolutional Neural Networks via Attention Transfer", *ArXiv Preparing ArXiv*:1612.03928v1, pp. 1-13, (2016).
Zhang, Z., et al., "Multi-Target, Multi-Camera Tracking by Hierarchical Clustering; Recent Progress on DukeMTMC Project", *ArXiv Preprint ArXiv*, 1712.09531, 4 pages total, (2017).
Zheng, L., et al. "Person Re-identification: Past, Present and Future", *ArXiv Preprint ArXiv*:1610.02984v1, 20 pages total, (2016).
Zhong, Z., et al., "Random Erasing Data Augmentation", *ArXiv Preprint ArXiv*:1708.04896v2, 10 pages total, (2017).
Zhou, K., et al., "Torchreid: A Library for Deep Learning Person Re-Identification in Pytorch", *ArXiv Preprint ArXiv*:1910.10093v1, 9 pages total, (2019).

(56) References Cited

OTHER PUBLICATIONS

Zhou, K., et al., "Learning Generalisable Omni-Scale Representations for Person Re-Identification", *IEEE Transaction on Pattern Analysis and Machine Intelligence*, ArXiv Preprint ArXiv:1910.06827v5, pp. 1-14, (2019).
Transportation for London, "Walking Action Plan: Making London the World's Most Walkable City", *Mayor of London, Transport for London, Every Journey Matters*, pp. 1-57, (Jul. 2018).
Arabi, S., et al. "A deep-learning-based computer vision solution for construction vehicle detection", *Computer-Aided Civil and Infrastructure Engineering*, 35(7), pp. 753-767, (2020).
Barney, G., et al., *Elevator Traffic Handbook: Theory and Practice*, Second Edition, Introduction, Routledge 48 pages total, (2015).
Brunetti, A., et al., "Computer vision and deep learning techniques for pedestrian detection and tracking: A Survey", *Neurocomputing*, 300, pp. 17-33, (2018).
Chen, X., et al., "Kinect-Based Pedestrian Detection for Crowded Scenes," *Computer-Aided Civil and Infrastructure Engineering*, 31(3), pp. 229-240, (2016).
Chi, S., et al., "Automated Object Identification Using Optical Video Cameras on Construction Sites", *Computer-Aided Civil and Infrastructure Engineering*, 26(5), pp. 368-380, (2011).
Chou, Yu-Sheng, et al., "Dynamic Gallery for Real-time Multi-target Multi-camera Tracking", *2019 16th IEEE International Conference on Advanced Video and Signal Based Surveillance*, AVSS 2019. pp. 1-8, (2022).
Cimellero, G.P., et al., "Integrating a Human Behavior Model within an Agent-Based Approach for Blasting Evacuation", *Computer-Aided Civil and Infrastructure Engineering*, 34(1), pp. 3-20, (2019).
Gao, Y., et al., "Deep leaf-bootstrapping generative adversarial network for structural image data augmentation", *Computer-Aided Civil and Infrastructure Engineering*, 34(9), pp. 755-773, (2019).
Han, J., et al., "Data Mining: Concepts and Techniques", *Third Edition, Elsevier*, 740 pages total, (2011).
Lee, H.Y., et al., "Laying out the occupant flows in public buildings for operating efficiency", *Building and Environment*, 51, pp. 231-242, (2012).
Li, B., et al., "A Review on Vision-based Pedestrian Detection in Intelligent Transportation Systems", *Proceedings of 2012 9th IEEE International Conference on Networking, Sensing and Control*, pp. 393-398, (2012).
Liu, L., et al., "Deep Learning for Generic Object Detection: A Survey", *International Journal of Computer Vision*, 128(2). pp. 261-318, (2020).
Luo, X., et al., "Combining deep features and activity context to improve recognition of activities of workers in groups", *Computer-Aided, Civil and Infrastructure Engineering*, 35, pp. 965-978, (2020).
Malinovskiy, Y., et al., "Model-Free Video Detection and tracking of Pedestrians and Bicyclists", *Computer-Aided Civil and Infrastructure Engineering*, 24(3), pp. 157-168 (2009).
Martani, C., et al., "Pedestrian monitoring techniques for crowd-flow Prediction", *Proceedings of the International of Civil Engineers—Smart Infrastructure and Construction*, 170(2), pp. 17-27, (2017).
Rafiei, M.H., et al., "A New Neural Dynamic Classification Algorithm", *IEEE Transactions on Neural Networks and Learning Systems*, 28(12), pp. 3074-3083, (Dec. 2017).
Ristani, E., et al., "Performance Measures and a Data Set for Multi-target, Multi-camera Tracking", *European Conference on Computer Vision Workshops (EECVW)*, 2, pp. 43-51, (2016).
Schimpl, M., et al., "Association between Walking Speed and Age in Healthy, Free-Living Individuals Using Mobile Accelerometry—A Cross-Sectional Study", *PLoS One*, 6(8), e23299, (pp. 1-7), (2011).

Sharifi, M.S., et al., "A large-scale controlled experiment on pedestrian walking behavior involving individuals with disabilities", *Travel Behaviour and Society*, 8, pp. 14-25, (2017).
Shen, J., et al., "A convolutional neural-network-based pedestrian counting model for various crowded scenes", *Computer-Aided Civil and Infrastructure Engineering*, 34(10), pp. 897-914, (2019).
World Urbanization Prospects, The 2018 Revision, *United Nations, Department of Economic and Social Affairs*, pp. 1-126, (2018).
Wang, G. et al., "Learning Discrimination Features with Multiple Granularities for Person Re-Identification," *Proceedings of the 26th ACM International Conference on Multimedia*, pp. 274-284, (2018).
Wang, M., et al., "A unified convolutional neural network integrated with conditional random field for pipe defect segmentation", *Computer-Aided Civil and Infrastructure Engineering*, 35, pp. 162-177, (2019).
Wang, N., et al., "Autonomous damage segmentation and measurement of glazed tiles in historic buildings via deep learning", *Computer-Aided Civil and Infrastructure Engineering*, 35(3), pp. 277-291, (2020).
Wu, D., "Deep learning-based methods for person re-identification: A comprehensive review," *Neurocomputing*, 337, pp. 354-371, (2019).
Zhang, B., et al., "A methodology for obtaining spatiotemporal information of the vehicles on bridges based on computer vision", *Computer-Aided Civil and Infrastructure Engineering*, 34(6), pp. 471-487, (2019).
Zheng, J., et al., "Detecting Cycle Failures at Signalized Intersections Using Video Image Processing", *Computer-Aided Civil and Infrastructure Engineering*, 21(6), pp. 425-435, (2006).
Adeli, H., "Neural Networks in Civil Engineering: 1989-2000", *Computer-Aides Civil and Infrastructure Engineering*, 16(2), pp. 126-142 (1989-2000).
Wong, P.K., et al., "Enriched and discriminative convolutional neural network features for pedestrian re-identification and trajectory modeling", *Computer Aided Civil and Infrastructure Engineering*, vol. 37, pp. 573-592 (2022).
Part 1—"Sustainable Communicates in Bronx: Leveraging Regional Rail for Access, Growth and Opportunity" *Department of City Planning of New York City*, pp. 1-109, (117 pages total) (May 2014).
Part 2—Sustainable Communicates in Bronx: Leveraging Regional Rail for Access, Growth and Opportunity *Department of City Planning of New York City*, pp. 110-225, (116 pages total) (May 2014).
Schwartz, W., et al., "Bicycle and Pedestrian Data: Sources, Needs and Gaps", *U.S. Department of Transportation, Bureau of Transportation Statistics*, (80 pages total), 2000.
Seneviratne, P.N., Analysis of factors affecting the choice of route of pedestrians, *Transportation Planning and Technology*, 10(2), pp. 147-159, (1985).
Thornton, C., et al., "Pathfinder: An Agent-Based Egress Simulator", In R. D. Peacock, E. D. Kuligowski, & J. D. Averill (Eds.), *Pedestrian and Evacuation Dynamics* (pp. 889-892). Springer US, (2011).
Muraleetharan, T., et al., Overall Level of Services of Urban Walking Environment and Its Influence on Pedestrian Route Choice Behavior: Analysis of Pedestrian Travel, *Transportation Research Record; Journal of the Transportation Board, No. 2002, Transportation Research Board of the National Academies*, Washington, D.C., pp. 7-17, (2002).
Wu, Rih-Teng, "Pruning deep convolitional neural networks for efficient edge computing in condition assessment of infrastructures", *Computer-Aided Civil and Infrastructure Engineering*, Wiley, DOI: 10.1111/mice.12449, pp. 774-789, (2019).

\* cited by examiner

ENRICHED AND DISCRIMINATIVE CONVOLUTIONAL NEURAL NETWORK FEATURES FOR PEDESTRIAN RE-IDENTIFICATION AND TRAJECTORY MODELING

CROSS-REFERENCE TO RELATED APPLICATIONS

This application claims the benefit of U.S. Provisional Application No. 63/249,025 titled "ENRICHED AND DISCRIMINATIVE CONVOLUTIONAL NEURAL NETWORK FEATURES FOR PEDESTRIAN RE-IDENTIFICATION AND TRAJECTORY MODELING," filed Sep. 28, 2021, the entire contents of which is incorporated herein by reference.

BACKGROUND

Smart city planning has been strongly promoted in response to the need of new area development and urban renewal. Citizens particularly are the core entities in urban areas, where United Nations (2018) forecasted that the urban population worldwide will rise to 68% by 2050. A huge demand for in-town travel is hence observed, which highlights the essence of human-centric urban design. Walking, as a natural mode of mobility, has been incorporated into the transport and land-use planning in different cities to strive for a more walkable urban environment. As emphasized by the Bureau of Transportation Statistics of U.S., recognizing pedestrian travel preferences and demands greatly facilitates the policymaking for urban planning. The level of service of existing facilities may be evaluated, based on which facility planners may make more informed decision of improvement measures. With the enhanced knowledge of existing pedestrian needs, the potential utility of alternative designs may be better forecasted.

Recently, computer vision and deep learning techniques have been widely incorporated into image processing, in which a trained deep neural network automatically extracts useful features from images to perform different tasks, e.g. generic object detection, classification and tracking. Nevertheless, existing vision-based pedestrian flow studies are limited in geographic coverage, e.g. a street segment or traffic junction captured by one camera. Recognizing pedestrian movement in a wider regional scale would enable more comprehensive planning of an urban area.

One approach is to investigate pedestrian tracking across multiple cameras that are scattered for a larger geographic coverage. Identification of pedestrian movement across multiple cameras may be formulated into a pedestrian re-identification (ReID) problem, which is defined as follows. Raw images from multiple cameras are first processed to obtain a set of detections of individual person. The aim of ReID is to establish the same identity to all images of the same person.

However, even some state-of-the-art ReID methods may fail to match or distinguish identities due to several challenges, e.g. change of clothing, occlusion, variations of pose and appearance across different cameras. Thus, there is a need for improving image processing techniques for use, among other applications, in recognizing pedestrian movement in a wider regional scale.

SUMMARY

In an exemplary embodiment, the present disclosure provides a method for image processing performed by a processing system. The method comprises obtaining data from a plurality of cameras, extracting features for each of multiple images included in the data, determining a descriptor for each of the multiple images and identifying one or more images among the multiple images associated with an object among one or more objects based on the descriptors of the multiple images. The data comprises the multiple images that are associated with the one or more objects. A respective descriptor for a respective image comprises a first set of units representing all the extracted features in the respective image and a second set of units representing a subset of the extracted features in the respective image.

In a further exemplary embodiment, the first set of units in the respective descriptor is determined based on a first feature map of the respective image corresponding to the respective descriptor. The second set of units in the respective descriptor is determined based on a second feature map associated with the first feature map. The second feature map is generated by removing a patch of information included in the first feature map. The patch in the first feature map takes the full height of the first feature map and covers a portion of the full width of the first feature map.

In a further exemplary embodiment, the first set of units in the respective descriptor is determined based on a first feature map of the respective image corresponding to the respective descriptor. The second set of units in the respective descriptor is determined based on a second feature map associated with the first feature map. The second feature map is generated by removing a patch of information included in the first feature map. The patch in the first feature map takes the full width of the first feature map and covers a portion of the full height of the first feature map.

In a further exemplary embodiment, the method further comprises grouping the descriptors into a number of clusters based on similarities between the descriptors and determining an aggregated descriptor for each cluster. Identifying the one or more images among the multiple images associated with the object among the one or more objects is further based on the aggregated descriptors for the number of clusters.

In a further exemplary embodiment, the respective descriptor is represented by a vector comprising a plurality of elements. Determining the aggregated descriptor for each cluster further comprises determining a mean value for each element in the aggregated descriptor based on corresponding elements in descriptors in a cluster.

In a further exemplary embodiment, the aggregated descriptor corresponding to a respective cluster is updated in response to the respective cluster being updated.

In a further exemplary embodiment, the data from the plurality of cameras comprises timestamp information and camera identity information corresponding to the multiple images.

In a further exemplary embodiment, the method further comprises determining a trajectory for each of the one or more objects across the plurality of cameras based on the timestamp information and camera identity information.

In a further exemplary embodiment, the method further comprises tracking the trajectories of the one or more objects across the plurality of cameras, and determining travel preferences and demands of the one or more objects.

In a further exemplary embodiment, each of the multiple images is a portion of a raw image. The portion of the raw image comprises one object among the one or more objects.

In another exemplary embodiment, the present disclosure provides a system for image processing. The system for image processing comprises a plurality of cameras and a computing system. The plurality of cameras is configured to obtain data. The data comprises multiple images associated with one or more objects. The computing system is configured to extract features for each of the multiple images, determine a descriptor for each of the multiple images, and identify one or more images among the multiple images associated with an object among the one or more objects based on the descriptors of the multiple images. A respective descriptor for a respective image comprises a first set of units representing all the extracted features in the respective image and a second set of units representing a subset of the extracted features in the respective image.

In a further exemplary embodiment, the first set of units in the respective descriptor is determined based on a first feature map of the respective image corresponding to the respective descriptor. The second set of units in the respective descriptor is determined based on a second feature map associated with the first feature map. The second feature map is generated by removing a patch of information included in the first feature map. The patch in the first feature map takes the full height of the first feature map and covers a portion of the full width of the first feature map.

In a further exemplary embodiment, the first set of units in the respective descriptor is determined based on a first feature map of the respective image corresponding to the respective descriptor. The second set of units in the respective descriptor is determined based on a second feature map associated with the first feature map. The second feature map is generated by removing a patch of information included in the first feature map. The patch in the first feature map takes the full width of the first feature map and covers a portion of the full height of the first feature map.

In a further exemplary embodiment, the computing system is further configured to group the descriptors into a number of clusters based on similarities between the descriptors, and determine an aggregated descriptor for each cluster. Identifying the one or more images among the multiple images associated with the object among the one or more objects is further based on the aggregated descriptors for the number of clusters.

In a further exemplary embodiment, the respective descriptor is represented by a vector comprising a plurality of elements. Determining the aggregated descriptor for each cluster further comprises: determining a mean value for each element in the aggregated descriptor based on corresponding elements in descriptors in a cluster.

In yet another exemplary embodiment, the present disclosure provides a non-transitory computer-readable medium having processor-executable instructions stored thereon for image processing using a processing system. The processing system executes the instructions to facilitate obtaining data from a plurality of cameras, extracting features for each of multiple images included in the data, determining a descriptor for each of the multiple images, and identifying one or more images among the multiple images associated with an object among one or more objects based on the descriptors of the multiple images. The data comprises the multiple images that are associated with the one or more objects. A respective descriptor for a respective image comprises a first set of units representing all the extracted features in the respective image and a second set of units representing a subset of the extracted features in the respective image.

In a further exemplary embodiment, the data from the plurality of cameras comprises timestamp information and camera identity information corresponding to the multiple images.

In a further exemplary embodiment, the processing system executes the instructions to further facilitate determining a trajectory for each of the one or more objects across the plurality of cameras based on the timestamp information and camera identity information.

In a further exemplary embodiment, the processing system executes the instructions to further facilitate tracking the trajectories of the one or more objects across the plurality of cameras, and determining travel preferences and demands of the one or more objects.

In a further exemplary embodiment, the processing system executes the instructions to further facilitate grouping the descriptors into a number of clusters based on similarities between the descriptors, and determining an aggregated descriptor for each cluster. Identifying the one or more images among the multiple images associated with the object among the one or more objects is further based on the aggregated descriptors for the number of clusters. The aggregated descriptor corresponding to a respective cluster is updated in response to the respective cluster being updated.

BRIEF DESCRIPTION OF THE DRAWINGS

The present systems and methods for image processing are described in detail below with reference to the attached drawing figures, wherein.

DETAILED DESCRIPTION

Systems and methods are disclosed related to a ReID-based framework for pedestrian trajectory recognition across multiple cameras. In the ReID-based framework, a pedestrian ReID model extracts features for reliable identity mapping. The ReID implements a feature extraction model based on the techniques described in the present disclosure, thereby addressing the aforementioned challenges that limit the performance of the state-of-the-art ReID-based methods. Furthermore, the features extracted are processed for identity mapping, which may be formulated as a hierarchical clustering problem. Based on the results from the identify mapping, trajectories of each identity across multiple cameras are eventually recognized. To this end, pedestrian flow patterns can be automatically generated.

Figure 1A:
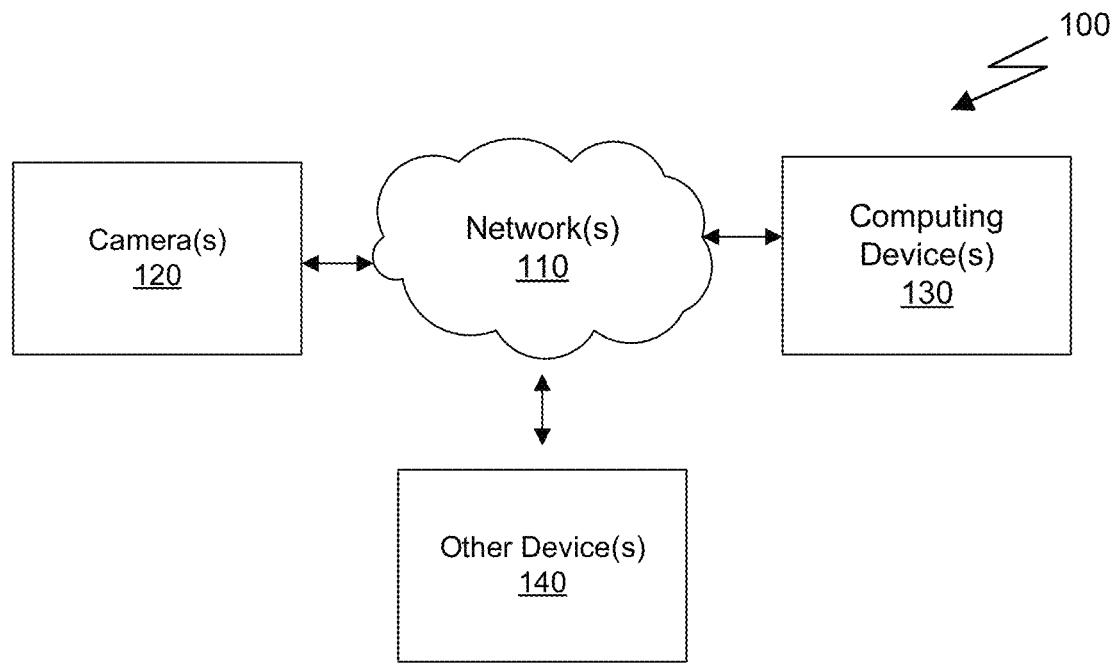
FIGS. 1A-1B illustrate a network environment for implementing techniques in the present disclosure, in accordance with some embodiments.
Figure 1B:
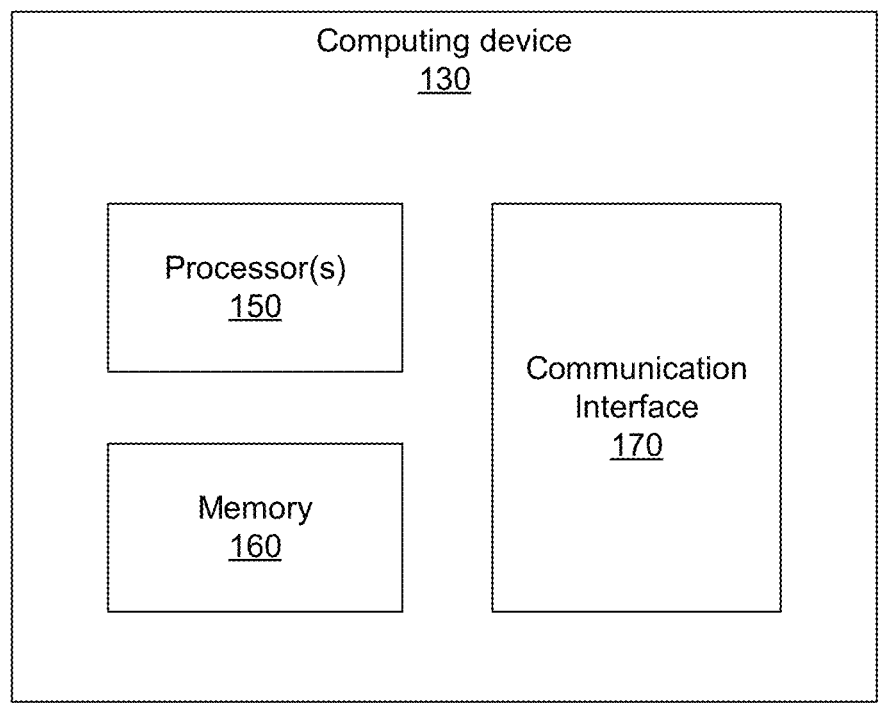

FIGS. 1A-1B illustrate a network environment 100 for implementing techniques in the present disclosure, in accordance with some embodiments.

Network environments suitable for use in implementing embodiments of the disclosure may include one or more cameras 120, one or more computing devices 130 and/or other devices 140. By way of example and not limitation, a camera 120 may be embodied as an imaging device, such as a video camera, a surveillance device/system, a drone, a robot, etc., or an imaging module integrated in an electronic device/system, such as a smartphone, or an autonomous vehicle). Computing devices 130 may include one or more client devices, one or more servers or a combination thereof. Examples of a computing device 130 may include but not limited to a Personal Computer (PC), a laptop computer, a workstation, etc. Other devices 140 may include network attached storage (NAS), other backend devices, or any other suitable device.

Components of a network environment 100 may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment 100 may include one or more cloud-based network environments, a distributed computing environment, a combination thereof, etc. A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). A cloud-based network environment may be private (e.g., limited to a single organization), may be public (e.g., available to many organizations), and/or a combination thereof (e.g., a hybrid cloud environment).

FIG. 1B illustrates a block diagram of an exemplary computing device 130 configured to implement various functions in accordance with some embodiments in the present disclosure.

As shown in FIG. 1B, the computing device 130 may include one or more processors 150, a communication interface 170, and a memory 160. The processor(s) 150 may be configured to perform the operations in accordance with the instructions stored in memory 160. The processor(s) 150 may include any appropriate type of general-purpose or special-purpose microprocessor, such as central processing unit (CPU), graphic processing unit (GPU), parallel processing unit (PPU), etc. The memory 160 may be configured to store computer-readable instructions that, when executed by the processor(s) 150, can cause the processor(s) 150 to perform various operations disclosed herein. The memory 160 may be any non-transitory type of mass storage, such as volatile or non-volatile, magnetic, semiconductor-based, tape-based, optical, removable, non-removable, or other type of storage device or tangible computer-readable medium including, but not limited to, a read-only memory ("ROM"), a flash memory, a dynamic random-access memory ("RAM"), and/or a static RAM.

The communication interface 170 may be configured to communicate information between the computing device 130 and other devices or systems, such as the camera(s) 120, another computing device 130 or the other device(s) 140 as show in FIG. 1A. For example, the communication interface 170 may include an integrated services digital network ("ISDN") card, a cable modem, a satellite modem, or a modem to provide a data communication connection. As another example, the communication interface 170 may include a local area network ("LAN") card to provide a data communication connection to a compatible LAN. As a further example, the communication interface 170 may include a high-speed network adapter such as a fiber optic network adaptor, 10G Ethernet adaptor, or the like. Wireless links can also be implemented by the communication interface 170. In such an implementation, the communication interface 170 can send and receive electrical, electromagnetic or optical signals that carry digital data streams representing various types of information via a network. The network can typically include a cellular communication network, a Wireless Local Area Network ("WLAN"), a Wide Area Network ("WAN"), or the like.

The communication interface 170 may also include various I/O devices such as a keyboard, a mouse, a touchpad, a touch screen, a microphone, a camera, a biosensor, etc. A user may input data to the computing device 130 (e.g., a terminal device) through the communication interface 170.

In some embodiments, a display may be integrated as part of the computing device 130 or may be provided as a separate device communicatively coupled to the computing device 130. The display may include a display device such as a Liquid Crystal Display ("LCD"), a Light Emitting Diode Display ("LED"), a plasma display, or any other type of display, and provide a Graphical User Interface ("GUI") presented on the display for user input and data depiction. In some embodiments, the display may be integrated as part of the communication interface 170.

Figure 2:
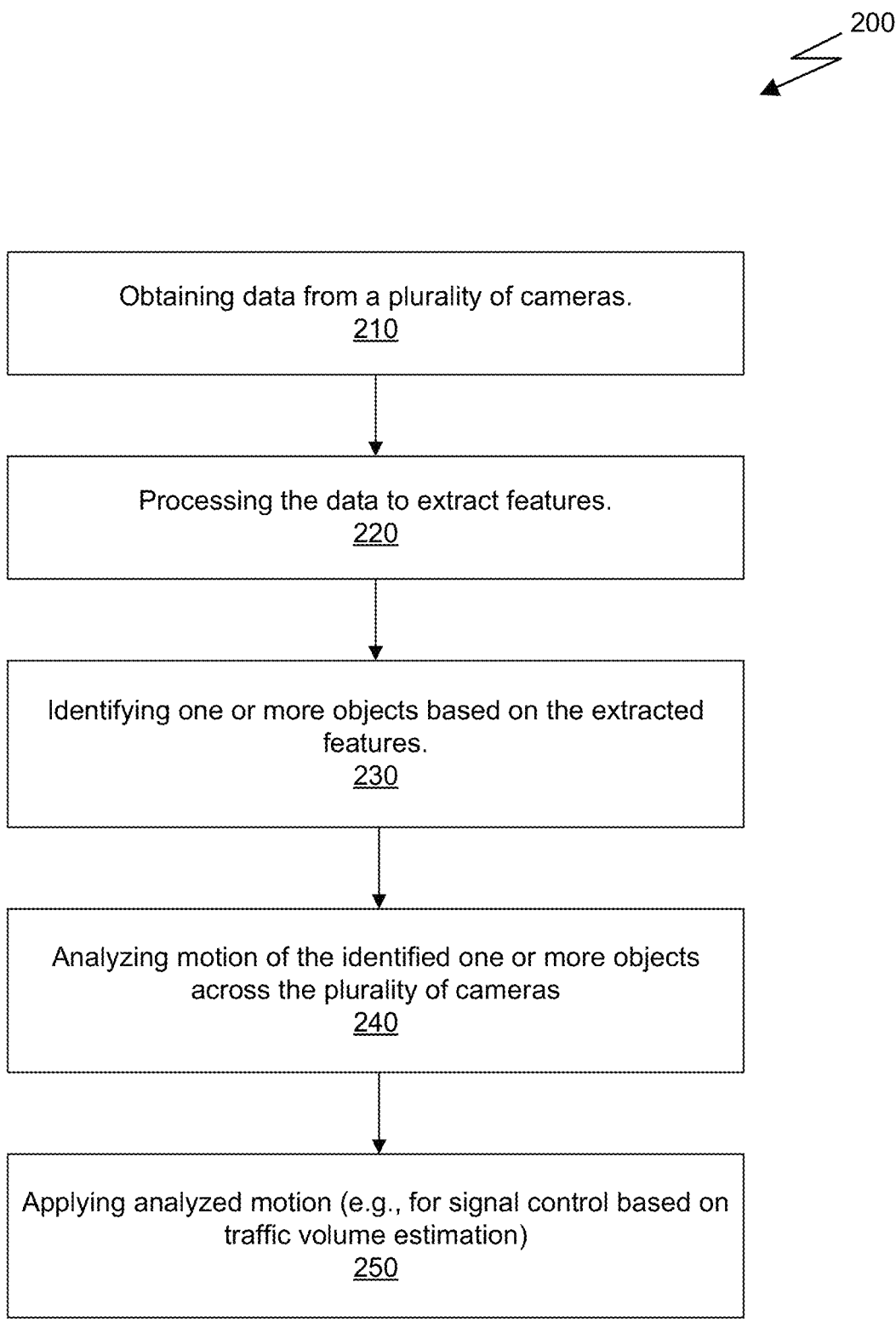
FIG. 2 illustrates a flowchart of a method for implementing re-identification algorithms, in accordance with some embodiments.

FIG. 2 illustrates a flowchart of a method 200 for implementing Re-ID-based algorithms, in accordance with some embodiments. The method 200 may be performed by the computing device(s) 130 as shown in FIG. 1A/1B or a processing system including one or more computing devices 130. In an embodiment, a processing system may further include multiple cameras 120 for data collection. It will be recognized that the method 200 may be performed in any suitable environment and that any of the following blocks may be performed in any suitable order.

To illustrate as an example, the method 200 is implemented in a pedestrian ReID application, by processing images capturing different pedestrians across multiple cameras 120 in a network environment 100 as shown in FIG. 1A. The multiple cameras 120 may be allocated at different geographic locations to cover a region of interest. Each camera 120 may be responsible for a geographic coverage, for example, a street segment or traffic junction captured by one camera. The multiple cameras 120 may be positioned with non-overlapped fields of view. It should be noted that the exemplary application of pedestrian ReID is described solely for illustration purposes and is not intended to limit the present disclosure.

At step 210, the computing device 130 obtains data from one or more cameras 120. In some examples, the data from the one or more cameras 120 may include images from the one or more cameras 120. In some instances, the images from the one or more cameras 120 may be tailored to generate the data for the computing device 130 to process in a proceeding step, such as step 220 in the method 200. For instance, the images may be cropped to remove a number of pixels in the images that are irrelevant to the target objects (e.g., the pedestrians), so that the remainder portion(s) of the images to be processed include less background noise, thus allowing for a reduced computational complexity and an improved performance of the ReID process. To this end, the data may include one or more portions of an image from a camera 120. One portion of an image may include a plurality of pixels included in the image. The plurality of pixels in the portion of the image may be associated with an object, such as a pedestrian, in the image. The step of tailoring the images may be performed by the computing device 130 or other devices (e.g., another computing device(s) 130 or other device(s) 140) in the network environment 100 in FIG. 1A. In some variations, the data obtained by the computing device 130 may include metadata associated with the images captured by the cameras 120. The metadata associated with each image may include various information, such as a timestamp indicating the moment of capturing the image, a corresponding camera number that captures the image, and any other suitable information.

Figure 3:
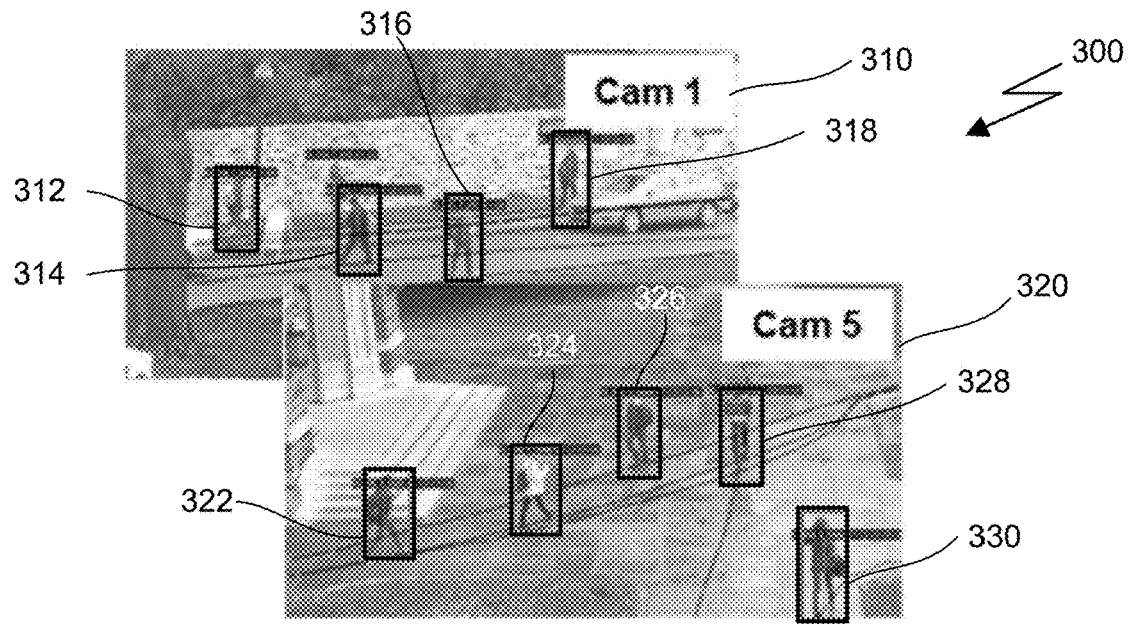
FIG. 3 demonstrates exemplary data in multiple images obtained by multiple cameras, in accordance with some embodiments.

FIG. 3 demonstrates exemplary data 300 in multiple images obtained by multiple cameras 120, in accordance with some embodiments. To illustrate, in a region of interest for pedestrian analysis, a set of cameras 120 may be scattered, with disjoint fields of view. Each camera 120 may be pre-assigned with a unique number (e.g., a camera number) for identification purpose. Each camera 120 may obtain a video stream, which includes a stack of raw images.

As shown in FIG. 3, the data 300 may include a first image 310 captured by a camera 120 labeled as "Cam 1" and a second image 320 captured by a different camera 120 labeled as "Cam 5." Each of the first image 310 and the second image 320 captures a plurality of pedestrians within the geographic coverage of the respective camera. Various object recognition algorithms may be applied to detect the pedestrians in the images.

In an embodiment, one or more bounding boxes may be overlaid on each of the images to encapsule the detected pedestrian(s) in the image. A bounding box may represent a detection of a pedestrian, which includes a subset of pixels in an image. As shown in FIG. 3, in the first image 310, four pedestrians are detected and encapsuled by bounding boxes 312, 314, 316, and 318. In the second image 320, five pedestrians are detected and encapsuled by bounding boxes 322, 324, 326, 328, and 330.

In further embodiments, for each image capturing multiple pedestrians, the portion of image around each pedestrian may be cropped as accurately as possible. This may be automated by firstly generating a rectangular bounding box around each pedestrian, and then cropping each bounding box from the raw image.

Hereinafter, the term "image" refers to a portion of an image corresponding to a bounding box, which is cropped from a raw image.

At step 220, the computing device 130 processes the data to extract features. In an embodiment, the computing device 130 may process the images in the data to extract features. The data may include images obtained from multiple cameras 120.

Figure 4:
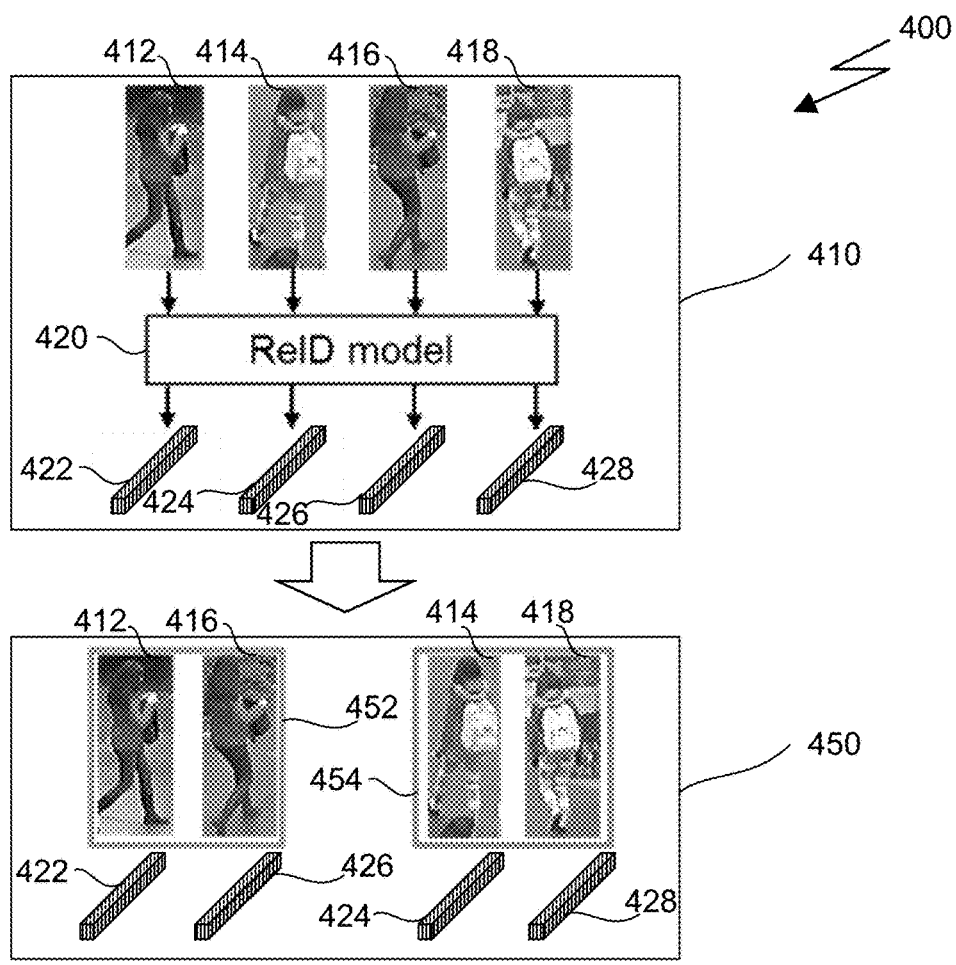
FIG. 4 illustrates a flowchart of processing multiple images by the computing device, in accordance with some embodiments.

FIG. 4 illustrates a flowchart 400 of processing multiple images by the computing device 130, in accordance with some embodiments. The flowchart 400 demonstrates a step of extracting features from multiple images in block 410 and a step of grouping the extracted features in block 420. The latter step of grouping the extracted features in block 420 will be described in detail in step 230 of the method 200 in FIG. 2.

As shown in FIG. 4, the computing device 130 may implement a ReID-based feature extraction model 420 (referred to as a ReID model) to process multiple images in the data obtained in step 210. As an example, the ReID model 420 takes images 412, 414, 416, and 418 as inputs. The images 412 and 416 capture a first pedestrian in different raw images. The images 414 and 418 capture a second pedestrian in different raw images. The different raw images may be captured by the same or different cameras 120. The ReID model 420 may extract discriminative-and-distributed human features, from all the images obtained. Then, the ReID model 420 may output descriptors 422, 424, 426, and 428 based on the extracted features from the images 412, 414, 416, and 418, respectively.

Figure 5:
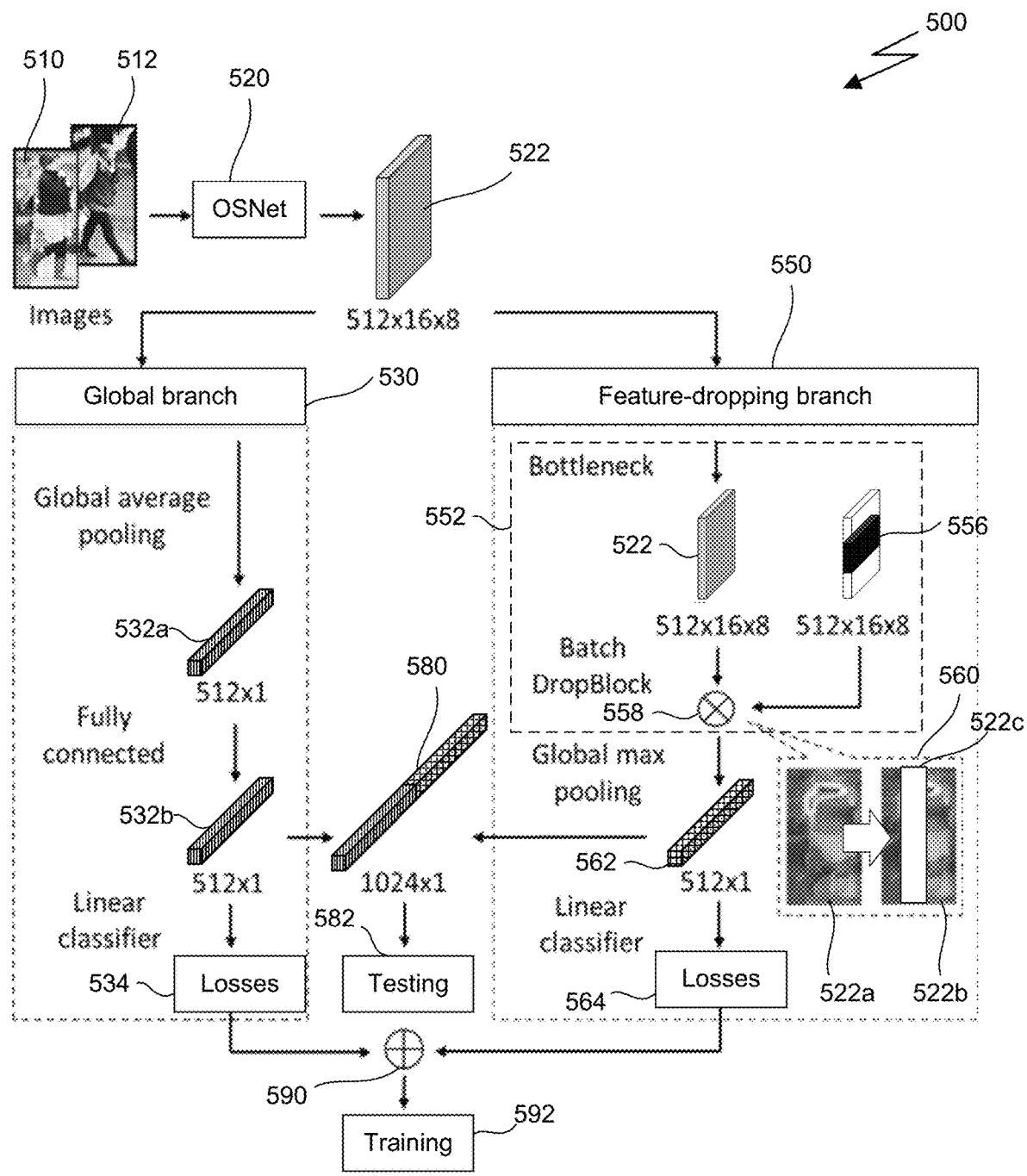
FIG. 5 demonstrates an exemplary model architecture implemented in the ReID model as shown in FIG. 4, in accordance with some embodiments.

FIG. 5 demonstrates an exemplary model architecture 500 implemented in the ReID model 420, in accordance with some embodiments. The model architecture 500 may take one or more images, such as images 510 and 512, as inputs and generate a descriptor 580 for each input image. In this example, an Omni-Scale network architecture (referred to as "OSNet") disclosed by Zhou et al. in "Learning Generalisable Omni-Scale Representations for Person Re-Identification" (published at ArXiv Preprint ArXiv:1910.06827, 1-13, in 2019), which is incorporated by reference in its entirety herein, is adopted as a backbone model for extracting convolutional feature maps for the input images. The model architecture, output tensors and CNN (referred to as "convolutional neural network") operations of OSNet, and its mechanisms are introduced below. OSNet is composed of five major convolutional blocks. The first one extracts coarser features and down-sampling the input images, while the next three blocks aggregate multi-scale convolutional features. The final block learns spatial attention, i.e. to select the most discriminative regions from the preceding feature maps by a pixel-wise convolution. By adopting OSNet for the backbone feature extraction, the model architecture 500 is capable of extracting discriminative features. On top of OSNet, techniques disclosed hereinafter are implemented to diversify the spatial attention of OSNet.

As shown in FIG. 5, an OSNet 520 in the model architecture 500 takes images 510 and 512 as inputs and outputs a batch of feature maps 522 for each of the images. In an embodiment, an input image to the OSNet 520 may be defined as including 256×128 pixels. In some examples, the images associated with different bounding boxes (e.g., 326 and 330 as shown in FIG. 3) may have different sizes. The computing device 130 may resize the images, thereby adapting the images to the predefined size for input images. For instance, the images in the data may be further cropped to reduce the number of pixels included in the images or padded with zero-valued pixels on the borders to increase the number of pixels included in the images.

The OSNet 520 may have different CNN layers with a plurality of filters implemented therein. The plurality of filters, when applied to the input image, resulting in the batch of feature maps 522. In this embodiment, the batch of feature maps 522 may include 512 feature maps. Each feature map may include 16×8 units/pixels to describe a feature as an outcome of applying a respective filter to the input image. As such, the entire batch of feature maps 522 may represent 512 features extracted from the input image.

Subsequently, the generated feature maps 522 proceed to two branches in the model architecture 500, which are a global branch 530 and a featuring-dropping branch 550. The global branch 530 may be a CNN including a plurality of layers, such as a convolutional layer, a pooling layer, a rectified linear unit (ReLU) layer, and a fully-connected (FC) layer. A layer in a CNN may include nodes and directed edges, where each edge may connect two of the nodes based on an activation function. Moreover, a layer in CNN may include one or more channels, where each channel may include a number of nodes in the layer. As shown in FIG. 5, The global branch 530 processes the batch of feature maps 522 with a global average pooling layer over each of 512 channels in the global averaging pooling layer, thereby generating a descriptor 532a for the batch of feature maps 522. In this example, a descriptor 532a includes 512 units corresponding to the outputs from the 512 channels of the global average pooling layer. In some instances, a descriptor 532a may be expressed by a vector including 512 elements. The global branch 530 processes the descriptors 532a with a fully connected layer and outputs descriptors 532b, which are of the same size of the descriptors 532a. As a result, a feature descriptor 532b including 512 units is obtained in the global branch for each input image to the model architecture 500.

The feature-dropping branch 550 is designed in parallel with the global branch 530 in the model architecture 500 as shown in FIG. 5. Similar to the global branch 530, the feature-dropping branch 550 may be a CNN including a plurality of layers. Both the feature-dropping branch 550 and the global branch 530 in the model architecture 500 process the batch of features maps 522 output from the OSNet 520. This implementation of the feature-dropping branch 550 forces the model architecture 500 to explore features from different regions in the feature maps 522, eventually yielding a distributed spatial attention over each person. The feature-dropping branch 550 may be implemented in both training and inference processes. As an example, a Batch DropBlock network architecture (referred to as "BDB"), for example as described in Dai et al., "Batch DropBlock network for person re-identification and beyond" (published at Proceedings of the IEEE International Conference on Computer Vision, 3691-3701, in 2019), which is incorporated by reference herein in its entirety, may be incorporated into the feature-dropping branch 550 in the model architecture 500. Mechanisms of the original BDB are presented below in an embodiment of the model architecture 500.

The batch of feature maps 522 generated by the OSNet backbone 520 first pass through a bottleneck layer 552. An example of the bottleneck layer 552 may be a bottleneck block described by He et al. in "Deep residual learning for image recognition" (published at Proceedings of the IEEE Conference on Computer Vision and Pattern Recognition, 2016-December, 770-778, in 2016), which is incorporated by reference herein in its entirety. In this embodiment, the bottleneck layer 552 facilitates a model training (e.g., for the model architecture 500) by avoiding that global average and max pooling are performed on the same backbone feature maps (e.g., the batch of feature maps 522 output from the OSNet 520). As implemented in the bottleneck layer 552, a rectangular dropblock 556, with pre-defined width and height, is randomly positioned to drop the same region of the batch of feature maps 522 within a training batch. The dimensions of the dropblock 556 may be adjusted by a ratio parameter, e.g. 0.25 of the width of a feature map 522. To illustrate as an example, the size of a dropblock 556 may be set as 16×2 pixels/units to cover part of the width of each feature map 522 in the batch of feature maps 522. In some variations, a batch of 512 dropblocks 556 may be implemented in the bottleneck layer 552 to process the batch of feature maps 522. The pixels in the dropblock 556 may be referred to as activation units, whose values are set to zero. As shown in action 558, a dropblock 556 may be applied to each feature map in the batch of feature maps 522 so as to generate a batch of partially dropped feature maps. Block 560 demonstrates an exemplary outcome of the action 558. As shown in block 560, the action 558 takes a feature map 522a as an input and outputs a partially dropped feature map 522b. In the partially dropped feature map 522b, values of the pixels/units in a region 522c may become zero, causing the loss of feature information in the region 522c. The partially dropped feature maps are then fed into a global max pooling layer in the feature-dropping branch 550, resulting in a descriptor 562 that includes 512 units.

By way of implementing the feature-dropping branch 550 in the model architecture 500, the most discriminative features can be dropped by the feature-dropping branch 550, such that a global max pooling layer in the feature-dropping branch 550 may extract relatively weaker features, thereby obtaining distributed features from the input images. To this end, the weak features may be gradually strengthened during a training/inference process, allowing for an enhancement of feature diversity.

During a training process, the descriptor generated in each branch may be used for classifying the identity of a person, by a linear classification layer in the model architecture 500. Certain operations in this training process may be implemented in step 230 of the method 200 in FIG. 2.

Referring back to FIG. 5, a training loss may be computed according to a pre-defined loss function based on a generated descriptor. In this embodiment, losses are first computed against the output in each branch, and then summed up for training in block 592. As shown in FIG. 5, block 534 is the process of computing losses for descriptors 532b generated in the global branch 530. Block 564 is the process of computing losses for descriptors 562 generated in the feature-dropping branch 550. Block 582 is the process of testing the descriptor 580. The computed losses from block 534 and block 564 are summed by an action 590. The output of the action 590 is fed into block 592 to improve the model architecture 500, for example by optimizing a value function therein. As such, a training iteration may be completed. Likewise, a number of iterations may be performed to update the model architecture 500. This design aims to encourage both branches to supervise each other during training. The learning effects from each branch may be back-propagated to the same backbone network, which facilitates the entire model architecture 500 to extract discriminative-and-distributed features.

As for testing in block 582, identities are to be matched according to feature similarity. In FIG. 5, the globally pooled features from each branch, which are the descriptor 532b and the descriptor 562, may be concatenated into a single feature descriptor 580 of 1024 units. By comparing the feature descriptors of different persons, the similarities among them may be computed.

Figure 6A:
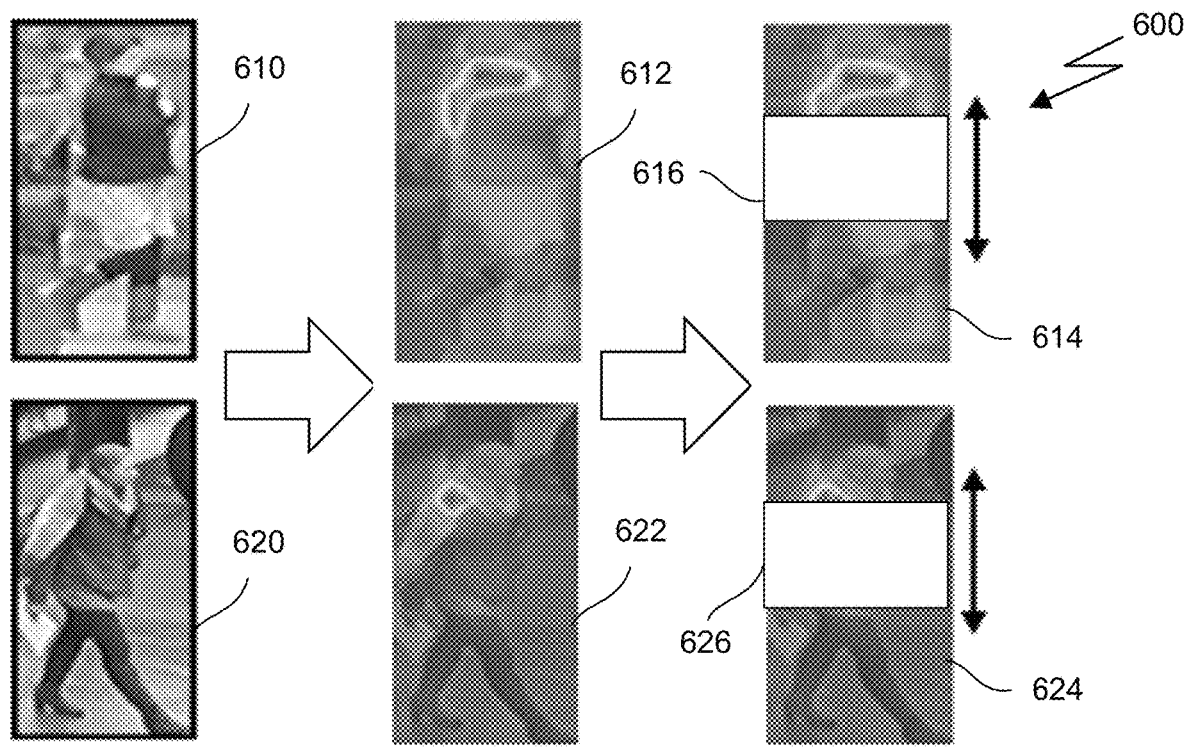
FIGS. 6A and 6B demonstrate processes of implementing two variants of dropblock placement, in accordance with some embodiments.
Figure 6B:
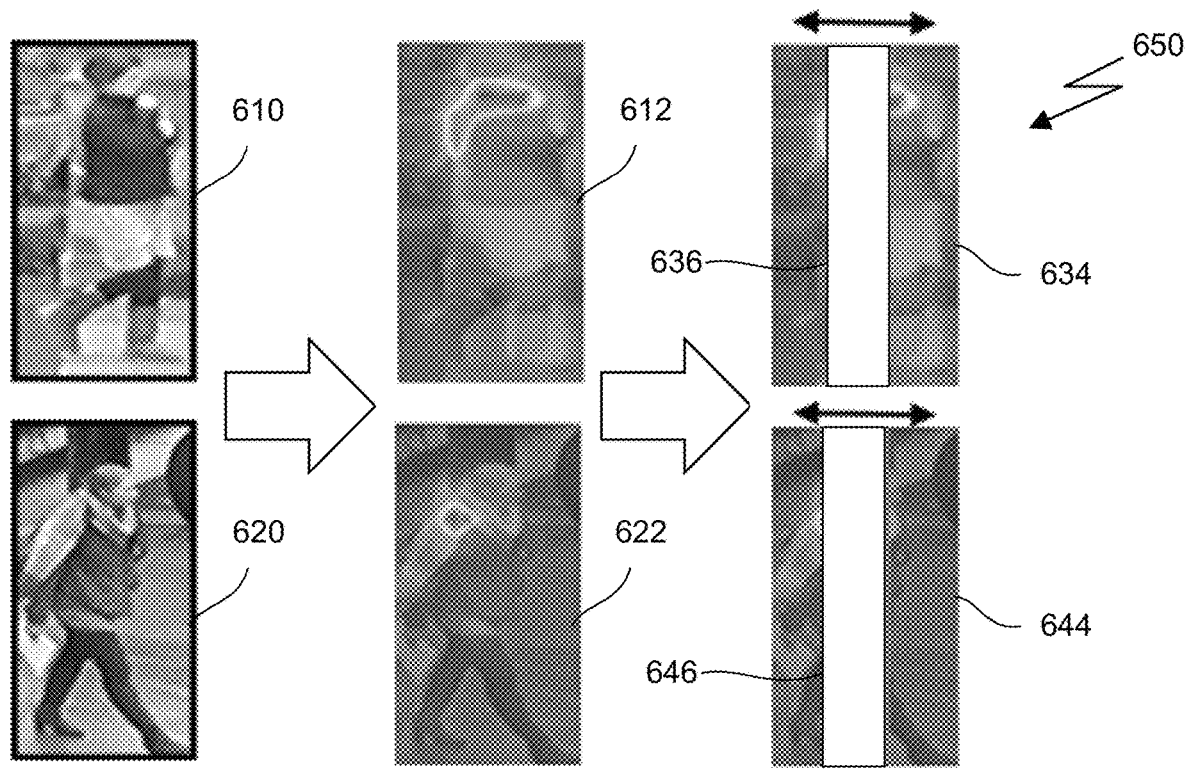

In another embodiment, a new mechanism of placing a dropblock on feature maps is implemented in the feature-dropping branch 550, instead of directly incorporating the original BDB. FIGS. 6A and 6B demonstrate processes of implementing two variants of dropblock placement, in accordance with some embodiments.

As shown in FIG. 6A, a process 600 uses a first variant, referred to as "BDB-vertical." Action units in a BDB-vertical dropblock are designed to take the full width of a feature map for feature-dropping, analogous to a vertically sliding block. In this example, the process 600 takes images 610 and 620 as inputs, generates corresponding first feature maps 612 and 622, and further generates second feature maps 614 and 624 as partially dropped feature maps. Patches 616 and 626 in the second feature maps 614 and 624, respectively, are examples of the vertically sliding blocks.

As shown in FIG. 6B, a process 650 uses a second variant, referred to as "BDB-horizontal." Action units in a BDB-horizontal dropblock are designed to take the full height of a feature map for feature-dropping, analogous to a horizontally sliding block. In this example, the process 650 takes images 610 and 620 as inputs, generates corresponding first feature maps 612 and 622, and further generates third feature maps 634 and 644 as partially dropped feature maps. Patches 636 and 644 in the third feature maps 634 and 644, respectively, are examples of the horizontally sliding blocks.

The BDB-horizontal is inspired from the characteristics of human skeletons. Different semantic parts of a human body are captured along vertical direction, ranging from the head at top, the arms in the middle to the shoes at bottom. When feature maps are partially covered by a BDB-horizontal dropblock, a variety of semantic parts would remain visible. As a result, at each training iteration, there are more semantic parts competing with each other to have the features strengthened. Hence, the BDB-horizontal may further facilitate the diversification of spatial attention over different body parts.

At step 230, the computing device 130 identifies one or more objects based on the extracted features.

Referring back to FIG. 4, all images of the same person are mapped to a unique identity based on the features extracted as shown in block 450 in the flowchart 400. In block 450, the images 412 and 416 are grouped in a first cluster 452 based on the similarities in the corresponding descriptors 422 and 426. The images 414 and 418 are grouped in a second cluster 454 based on the similarities in the corresponding descriptors 424 and 428.

Given a set of images across multiple cameras capturing an unknown number of identities, the developed feature extraction model (e.g., the ReID model 420) processes each image to obtain a descriptor to represent the extracted features. The subsequent objective is to group all the images of the same person together. Each person should be mapped to a unique identity that is maintained consistent for various situations, for example, when the person disappears and re-appears in another camera after a while. The results would indicate the movement history of each person, i.e. at which camera and at what timestamp the person appears. In other words, the trajectory of each person may be automatically recognized as spatial-temporal sequences of camera transition, from the metadata of images mapped to each person.

Referring back to the example demonstrated in FIG. 5, the model architecture 500 as shown in FIG. 5 generates a 1024-unit descriptor 580 for each image (e.g., the image 510 or 512). In some examples, the computing device 130 may process the 1024-unit descriptor 580 to generate a principle descriptor with a reduced dimensionality. Various algorithms may be adopted for the dimensionality reduction. For example, Principal Component Analysis (PCA) may be used, which summarize the information content in large data tables by means of a smaller set of "summary indices" that can be more easily visualized and analyzed. In this way, certain noise due to the high dimension of the descriptor may be alleviated, thus yielding better performance. After obtaining all principal descriptors of a set of n images, the computing device 130 may perform the grouping of the set of n images based on the corresponding descriptors or principal descriptors. First, the computing device 130 may compute a n×n distance matrix to denote pair-wise distances among all n descriptors. Then, the computing device 130 may perform a merging process. Initially, every descriptor may be defined as an individual cluster formed by itself, resulting in a total number of n clusters. The computing device 130 may search for the minimum non-zero distance in the distance matrix. Once finding the minimum non-zero distance, the computing device 130 may merge the corresponding pair of clusters with the minimum distance to form a single cluster. The computing device 130 may run a number of iterations to further grouping the set of n descriptors and/or the corresponding images.

The identity mapping may be formulated as a similarity-based clustering problem. Among different clustering algorithms, a hierarchical agglomerative clustering (HAC) algorithm is particularly adopted as the basis of the identity mapping techniques disclosed herein. Mathematical details of the HAC algorithm have been presented by Han et al. in "Data mining: concepts and techniques" (published at Elsevier: doi.org/10.1016/C2009-0-61819-5, in 2011), which is incorporated herein by reference in its entirety. One benefit of choosing HAC is that it does not require a prior knowledge of how many true clusters exist. This is a crucial characteristic in realistic identity mapping, where the exact number of persons should be unknown.

In accordance with some embodiments of the present disclosure, the above-mentioned HAC algorithm is modified by incorporating a strategy of incremental feature aggregation over multiple images. The strategy of incremental feature aggregation over multiple images may be implemented to address the challenges in matching or distinguishing identities. A single image may contain incomplete features of a person, possibly due to occluded body. Features from multiple images may complement each other, forming more complete features of a person. Hence, as more images are mapped to the same person, more robust features may possibly be extracted over multiple images. The strategy of incremental feature aggregation over multiple images may be facilitated by computing a mean value for each feature dimension among all the descriptors mapped to a cluster after merging the multiple descriptors into the cluster. The computation is expressed by, $$\bar{f}_n^d = \frac{1}{n}\left((n-1)\bar{f}_{n-1}^d + f_n^d\right), \quad \text{(Eq. 1)}$$

where $\bar{f}_n^d$ is the $d^{th}$ dimension value of the mean feature vector among n feature vectors of a cluster. As such, a mean vector may be obtained, which represents the descriptor of the cluster that is just enlarged to contain n samples. The above-discussed strategy can incrementally accumulate the useful features of a person when new images are mapped to the person, thus yielding more reliable features for identity mapping.

In a further embodiment, the computing device 130 updates the distance matrix by computing the new distances between all clusters at the current iteration.

The merging and updating processes may continue with increasing distances, until a termination condition is satisfied, for example when reaching a distance threshold beyond which images are too dissimilar to be matched with any other image(s).

Referring back to FIG. 2, at step 240, the computing device 130 analyzes motions of the identified objects across multiple cameras 120.

In an embodiment, the computing device 130 may automatically recognize trajectories of each person based on the identity mapping results from step 230. In some variations, the computing device 130 may use information obtained from the metadata of images to determine the trajectories. The information in the metadata may include timestamps and/or corresponding camera numbers associated with the images.

Figure 7:
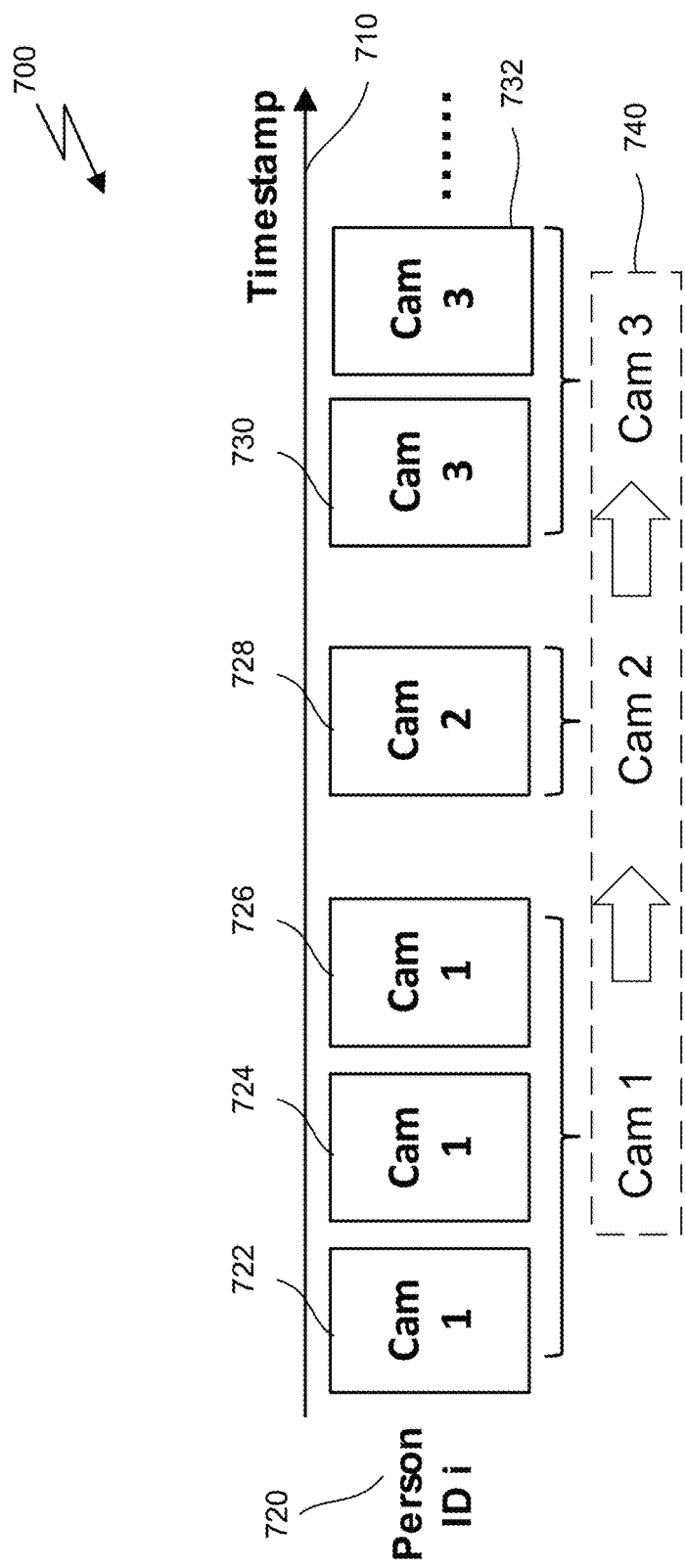
FIG. 7 demonstrates a process for determining a trajectory, in accordance with some embodiments.

FIG. 7 demonstrates a process 700 for determining a trajectory, in accordance with some embodiments. The aforementioned identity mapping process may cause the descriptors associated with the same person being grouped in one cluster. The cluster may be assigned with a unique person ID. In some examples, the computing device 130 may further map one or more images to a person ID base on the one-to-one relationships between the images and the descriptors.

As shown in FIG. 7, the computing device 130 recognizes a trajectory (e.g., in block 740) for an $i^{th}$ person ID 720. The $i^{th}$ person ID 720 may be associated with a plurality of images, such as images 722, 724, 726, 728, 730, 732, etc. The computing device 130 may obtain a timestamp and a camera number for each image based on the metadata of the image.

When determining a trajectory, the computing device 130 may first sort the images associated with the $i^{th}$ person ID 720 in a chronological order. To illustrate, an axis 710 is presented to indicate the timeline. The plurality of images, including the images 722, 724, 726, 728, 730, and 732 are arranged along the axis 710 based on temporal information, such as the corresponding timestamps. Each of the images 722, 724, 726, 728, 730, and 732 is associated with a camera number. In this example, the images 722, 724, and 726 are obtained by a first camera, denoted as Cam 1. The image 728 is obtained by a second camera, denoted as Cam 2. The images 730 and 732 are obtained by a third camera, denoted as Cam 3. The computing device 130 may determine the trajectory 740 for the $i^{th}$ person ID 720 based on the information of camera numbers. In some instances, the computing device 130 may remove duplicated within-camera records, so as to determine the transition of distinct camera numbers as shown in block 740 to be the trajectory for the $i^{th}$ person ID 720.

Referring back to FIG. 2, at step 250, the computing device 130 may apply the analyzed motion to achieve various advantages. For example, pedestrian flow data may be utilized for signal control (e.g., of traffic signals at various intersections and/or crosswalks) to provide for pedestrian flow optimization based on traffic volume estimation. Other applications of the analyzed motion include highway design, passenger density counting and prediction in public transit hubs, analysis of pedestrian crossing behaviors at traffic junctions for road safety enhancement.

In a further embodiment, the computing device 130 may continuously track the trajectories of the pedestrians in the region of interest so as to learn pedestrian travel preferences and demands.

Recognizing pedestrian travel preferences and demands greatly facilitates the policymaking for urban planning. The level of service of existing facilities could be evaluated, based on which facility planners could make more informed decision of improvement measures. With the enhanced knowledge of existing pedestrian needs, the potential utility of alternative designs could be better forecasted.

Pedestrian flow simulation is an effective approach to interpret the correlation between pedestrian movement and infrastructural characteristics. The actual pedestrian flow could be simulated in a digital environment, under the existing and several what-if facility layouts. The performances of different layouts could then be evaluated to support the decision-making of facility design.

Practically, real-world videos may be processed by the ReID framework of the present disclosure to exploit actual pedestrian flow statistics in a wide area, which may then calibrate movement behaviors such as route choice models. Typical types of pedestrian flow data include quantitative revealed preferences such as origin-destination counts and trajectory measurements.

The ReID framework of the present disclosure can also be applied for identification of suspicious human activities. For example, trajectories of a person of interest may be tracked across multiple cameras in an area under surveillance, for example, at an airport or a mass transit station.

Additional details and advantages relating to exemplary embodiments of the present disclosure are discussed in Wong, P. K.-Y., Luo, H., Wang, M., & Cheng, J. C. P., "Enriched and discriminative convolutional neural network features for pedestrian re-identification and trajectory modeling." Comput Aided Civ Inf. 2022, Volume 37, pages 573-592 (available at doi.org/10.1111/mice.12750), which is incorporated by reference in its entirety herein.

It is noted that the techniques described herein may be embodied in executable instructions stored in a non-transitory computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. The elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for image processing, comprising:
   obtaining, by a processing system, data from a plurality of cameras, the data comprising multiple images associated with one or more objects;
   extracting, by the processing system, features for each of the multiple images;
   determining, by the processing system, a descriptor for each of the multiple images, wherein a respective descriptor for a respective image comprises a first set of units representing all the extracted features in the respective image and a second set of units representing a subset of the extracted features in the respective image, wherein the respective descriptor is represented by a vector comprising a plurality of elements, and wherein each element corresponds to a feature among all the extracted features;
   grouping, by the processing system, the descriptors into a number of clusters based on similarities between the descriptors;
   determining, by the processing system, an aggregated descriptor for each cluster of the number of clusters, wherein determining the aggregated descriptor for each cluster further comprises determining a mean value for each element in the aggregated descriptor based on corresponding elements in descriptors in a cluster; and
   identifying, by the processing system, based on the aggregated descriptors for the number of clusters, one or more images among the multiple images associated with an object among the one or more objects.

2. The method of claim 1, wherein the first set of units in the respective descriptor is determined based on a first feature map of the respective image corresponding to the respective descriptor, wherein the second set of units in the respective descriptor is determined based on a second feature map associated with the first feature map, and wherein the second feature map is generated by removing a patch of information included in the first feature map, and the patch in the first feature map takes the full height of the first feature map and covers a portion of the full width of the first feature map.

3. The method of claim 1, wherein the first set of units in the respective descriptor is determined based on a first feature map of the respective image corresponding to the respective descriptor, wherein the second set of units in the respective descriptor is determined based on a second feature map associated with the first feature map, and wherein the second feature map is generated by removing a patch of information included in the first feature map, and the patch in the first feature map takes the full width of the first feature map and covers a portion of the full height of the first feature map.

4. The method of claim 1, wherein the aggregated descriptor corresponding to a respective cluster is updated in response to the respective cluster being updated.

5. The method of claim 1, wherein the data from the plurality of cameras comprises timestamp information and camera identity information corresponding to the multiple images.

6. The method of claim 5, further comprising:
   determining a trajectory for each of the one or more objects across the plurality of cameras based on the timestamp information and camera identity information.

7. The method of claim 6, further comprising:
   tracking the trajectories of the one or more objects across the plurality of cameras; and
   determining travel preferences and demands of the one or more objects.

8. The method of claim 1, wherein each of the multiple images is a portion of a raw image, and wherein the portion of the raw image comprises one object among the one or more objects.

9. A system for image processing, comprising:
   a plurality of cameras configured to obtain data, the data comprising multiple images associated with one or more objects; and
   a computing system configured to:
   extract features for each of the multiple images;
   determine a descriptor for each of the multiple images, wherein a respective descriptor for a respective image comprises a first set of units representing all the extracted features in the respective image and a second set of units representing a subset of the extracted features in the respective image, wherein the respective descriptor is represented by a vector comprising a plurality of elements, and wherein each element corresponds to a feature among all the extracted features;
   group the descriptors into a number of clusters based on similarities between the descriptors;
   determine an aggregated descriptor for each cluster of the number of clusters, wherein determining the aggregated descriptor for each cluster further comprises determining a mean value for each element in the aggregated descriptor based on corresponding elements in descriptors in a cluster; and identify, based on the aggregated descriptors for the number of clusters, one or more images among the multiple images associated with an object among the one or more objects.

10. The system of claim 9, wherein the first set of units in the respective descriptor is determined based on a first feature map of the respective image corresponding to the respective descriptor, wherein the second set of units in the respective descriptor is determined based on a second feature map associated with the first feature map, and wherein the second feature map is generated by removing a patch of information included in the first feature map, and the patch in the first feature map takes the full height of the first feature map and covers a portion of the full width of the first feature map.

11. The system of claim 9, wherein the first set of units in the respective descriptor is determined based on a first feature map of the respective image corresponding to the respective descriptor, wherein the second set of units in the respective descriptor is determined based on a second feature map associated with the first feature map, and wherein the second feature map is generated by removing a patch of information included in the first feature map, and the patch in the first feature map takes the full width of the first feature map and covers a portion of the full height of the first feature map.

12. The system of claim 9, wherein the data from the plurality of cameras comprises timestamp information and camera identity information corresponding to the multiple images.

13. The system of claim 12, wherein the computing system is further configured to:

determine a trajectory for each of the one or more objects across the plurality of cameras based on the timestamp information and camera identity information.

14. The system of claim 13, wherein the computing system is further configured to:

track the trajectories of the one or more objects across the plurality of cameras; and determine travel preferences and demands of the one or more objects.

15. A non-transitory computer-readable medium having processor-executable instructions stored thereon for image processing, wherein the processor-executable instructions, when executed, facilitate:

obtaining data from a plurality of cameras, the data comprising multiple images associated with one or more objects;

extracting features for each of the multiple images;

determining a descriptor for each of the multiple images, wherein a respective descriptor for a respective image comprises a first set of units representing all the extracted features in the respective image and a second set of units representing a subset of the extracted features in the respective image, wherein the respective descriptor is represented by a vector comprising a plurality of elements, and wherein each element corresponds to a feature among all the extracted features;

grouping the descriptors into a number of clusters based on similarities between the descriptors;

determining an aggregated descriptor for each cluster of the number of clusters, wherein determining the aggregated descriptor for each cluster further comprises determining a mean value for each element in the aggregated descriptor based on corresponding elements in descriptors in a cluster; and identifying based on the aggregated descriptors for the number of clusters, one or more images among the multiple images associated with an object among the one or more objects.

16. The non-transitory computer-readable medium of claim 15, wherein the data from the plurality of cameras comprises timestamp information and camera identity information corresponding to the multiple images.

17. The non-transitory computer-readable medium of claim 16, wherein the processor-executable instructions, when executed, further facilitate:

determining a trajectory for each of the one or more objects across the plurality of cameras based on the timestamp information and camera identity information.

18. The non-transitory computer-readable medium of claim 17, wherein the processor-executable instructions, when executed, further facilitate:

tracking the trajectories of the one or more objects across the plurality of cameras; and determining travel preferences and demands of the one or more objects.

19. The system of claim 9, wherein the aggregated descriptor corresponding to a respective cluster is updated in response to the respective cluster being updated.

20. The non-transitory computer-readable medium of claim 15, wherein the aggregated descriptor corresponding to a respective cluster is updated in response to the respective cluster being updated.

* * * * *